United States Patent [19]

Grahn et al.

[11] Patent Number: 4,704,909

[45] Date of Patent: Nov. 10, 1987

[54] MULTICOMPONENT FORCE-TORQUE SENSOR

[76] Inventors: Allen R. Grahn, 3735 Emigration Canyon, Salt Lake City, Utah 84108; Lynn Astle, 4291 Holloway Dr., Salt Lake City, Utah 84124

[21] Appl. No.: 757,360

[22] Filed: Jul. 22, 1985

[51] Int. Cl.$^4$ .............................................. G01L 5/16
[52] U.S. Cl. ........................ 73/862.04; 73/DIG. 4
[58] Field of Search ............ 73/862.04, 862.05, 862.06, 73/DIG. 4, 703, 189; 33/125 W; 367/99, 107, 114

[56] References Cited

U.S. PATENT DOCUMENTS

| | | | |
|---|---|---|---|
| 2,985,018 | 5/1961 | Williams | 73/703 |
| 3,140,612 | 7/1964 | Houghton et al. | 73/DIG. 4 |
| 3,303,694 | 2/1967 | D'Onofrio | 73/DIG. 4 |
| 3,428,139 | 2/1969 | Nolan | 367/114 X |
| 3,454,922 | 7/1969 | Dory | 367/107 X |
| 3,921,445 | 11/1975 | Hill et al. | 73/862.04 |

*Primary Examiner*—Charles A. Ruehl
*Attorney, Agent, or Firm*—Jon C. Christiansen

[57] ABSTRACT

An apparatus and process for detecting and quantifying force-torque components applied to a loadable means. The apparatus includes a plurality of signal-transmission means, a plurality of signal-reflection means, a plurality of signal-detection means and a deformable means which is deformable in response to the application of force-torque components to the loadable means. Application of a force-torque component to the loadable means results in the alteration of the distance traveled by a signal from signal-transmission means to signal detection means. The apparatus further includes a means for utilizing the detected signals to determine force-torque components.

28 Claims, 11 Drawing Figures

Force - Torque Components

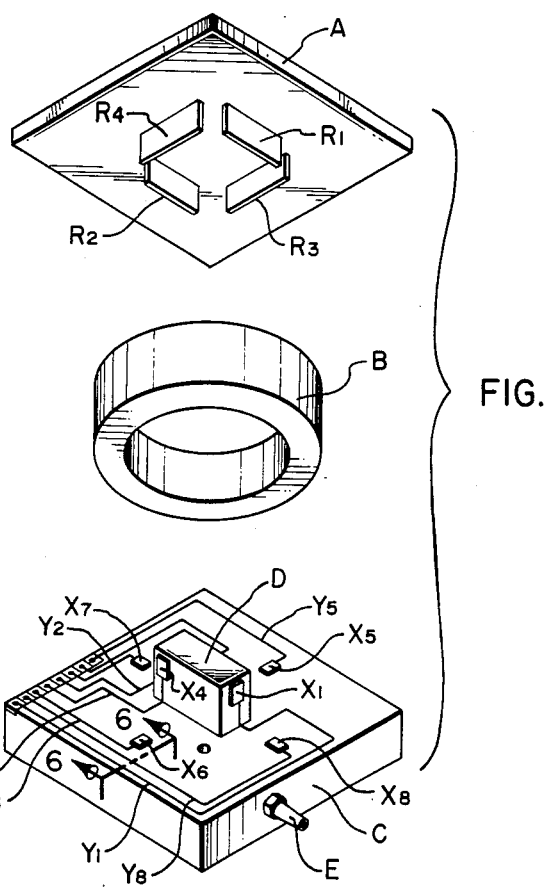
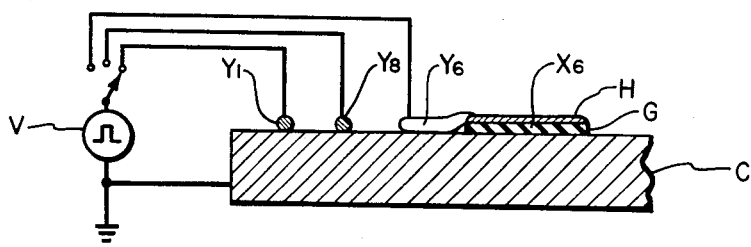
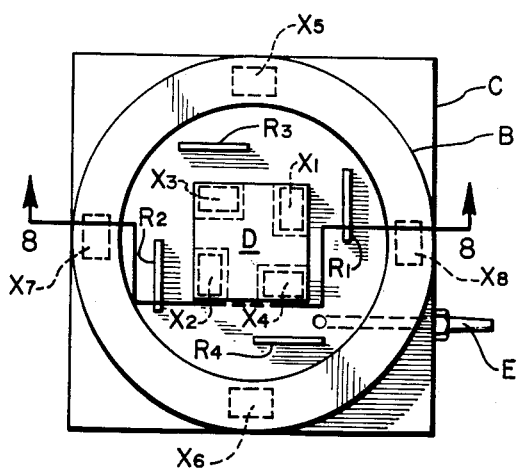
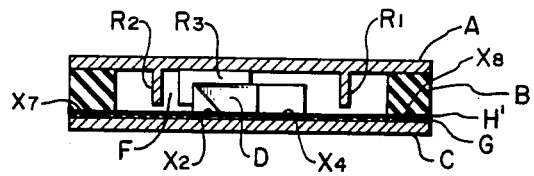
FIG. 5
FIG. 6
FIG. 7
FIG. 8

MULTICOMPONENT FORCE-TORQUE SENSOR

INTRODUCTION

This invention was made with Government support under Contract #NAS1-17997 awarded by the National Aeronautics and Space Administration. The Government has certain rights in this Invention.

This invention relates to the detection and quantification of force-torque components. This invention includes both the process and apparatus of detecting and quantifying force-torque components. This invention is a multicomponent force-torque sensor capable of detecting and quantifying force-torque components.

The inventors of this invention previously filed an application for Letters Patent for an invention entitled "Sensor". That application was filed on Sept. 25, 1984 and was assigned Ser. No. 653,904, now abandoned. The contents and disclosure of that application are incorporated herein by this reference. The invention described and claimed in that application differs from the present invention in many significant respects. The previous invention concerns itself with the detection, quantification and distribution of a single force component, i.e. an applied force normal to the sensor surface. As more fully described below, this invention concerns itself with multicomponent forces and torques.

This invention has application and use wherever the detection and quantification of force-torque components are desired. Of particular interest to the inventors is the utilization of this invention in the area of robotics. The multicomponent force-torque sensor can be utilized on the gripping surface of a robotic end effector to allow for "touch sensitive" operation. The sensor can provide a flow of force-torque component information to facilitate the grasping, transporation and manipulation of objects. Such information can assist in the determination and control of gripping force and object position, orientation and slippage. The sensor can enable precision insertion or fitting of an object without jamming or misalignment and can lessen the impact of collisions. The sensor can enable less accurate robots to perform precision tasks. Many other applications, uses and advantages of the invention, both within and without the area of robotics, exist and it is expected that many more applications, uses and advantages will arise in the future as technology continues its ever accelerating evolution. For example, the inventors envision application and use of this invention in the areas of industrial automation and prosthetics.

FORCE-TORQUE COMPONENTS

As used in this disclosure and the appended claims, the term "force-torque components" means the orthogonal force components $F_x$, $F_y$ and $F_z$ and the torque (or moment) components $M_x$, $M_y$ and $M_z$ as depicted in FIG. 1. The term "force-torque component" is the singular of force-torque components and means any one of $F_x$, $F_y$, $F_z$, $M_x$, $M_y$ and $M_z$. As shown in FIG. 1, $F_z$ represents the force component which is perpendicular to the plane defined by the paper on which FIG. 1 is drawn. $F_x$ represents the vertical horizontal force component and $F_y$ represents the vertical force component. Any force F can be expressed in terms of $F_x$, $F_y$ and $F_z$. Each of $M_x$, $M_y$ and $M_z$ represents the torque (or moment) about the axis (x, y or z) to which it corresponds. Any torque M can be expressed in terms of $M_x$, $M_y$ and $M_z$.

DESCRIPTION OF THE INVENTION

The multicomponent force-torque sensor of this invention has a loadable means to which force-torque components can be applied. Preferably, the loadable means is a metal cover plate but the loadable means can be any object or surface which can be subjected to force-torque components. For example, the loadable means can be the surface of the deformable means described below. If a material (e.g. plastic, ceramic, etc.) other than metal is employed, it is preferably a rigid material.

The sensor includes a deformable means which is deformable in response to the application of a force-torque component to the loadable means. Preferably the deformable means is affixed to the loadable means. This affixation can be accomplished, for example, by attaching the deformable means directly to the loadable means or by attaching the deformable means to some intermediate device or material attached to the loadable means. The deformable means is preferably an elastomeric material such as natural rubber, synthetic rubber or silicone rubber. The deformable means desirably behaves as a set of multidimensional linear springs. Compression, tension, shear and torsion characteristics can be experimentally measured under static and dynamic conditions for displacements and rotations to determine the suitability of any given material for use as the deformable means. Preferably the deformable means is a ring-shaped (cylindrical-shaped) elastomeric pad made of silicone rubber and is attached directly to the loadable means. A ring shape (cylindrical shape) is preferred for symmetry because this simplifies the calculation of force-torque components. The deformable means can, however, be in any other shape. Although not preferred, springs and spring-like devices can be used as the deformable means.

The sensor further includes a plurality of signal-transmission means, a plurality of signal-reflection means, a plurality of signal-detection means and at least one medium through which the signals travel. The signal-transmission means transmit signals which travel to the signal-reflection means and which are then reflected to the signal-detection means. The velocity of the signals through the medium traveled by the signals can be experimentally determined by persons of ordinary skill in the art. The signal-transmission means can be any means which transmits signals which can be reflected by the signal-reflection means and detected by the signal-detection means. The signal-detection means can be any means capable of detecting the reflected signals. Preferably, the signal-transmission means and signal-detection means are ultrasonic transducers as described more fully in Sections V and VI. The signal-reflection means can be any surface (including an interface) which reflects the signals. The signals can be ultrasonic signals, optical signals or any other signals capable of transmission, reflection and detection. When the signals are ultrasonic signals, the signal-reflection means can be a material of different acoustic impedance from the medium through which the signals travel. The signal-reflection means forms an interface with the medium through which the signals travel. If the reflection-means has a lower acoustic impedance than the medium, the signal is inverted (i.e. undergoes a 180° phase shift) upon reflection at the interface. If the reflection-means has a higher acoustic impedance than the medium, the signal is reflected without a 180° phase shift. The deformable means can serve as the medium through which some or all of the signals travel. A coupling agent, such as silicone oil or silicone gel, can also serve as the medium through which some or all of the signals travel. Any fluid or deformable material capable of providing a medium for signal transmission can be used as a coupling agent in the practice of this invention.

The transit time of each signal is the time required for the signal to travel from its signal-transmission means to its signal-detection means. The distance L traveled by the signal is a function of the velocity s of the signal in the medium and the signal transit time t (L=st). The signal-transmission means, signal-reflection means and signal-detection means are adapted and arranged so that the distance L is altered (i.e. increased or decreased) in response to the application of a force-torque component to the loadable means. Alternation of distance L for a given signal results in the alteration of the transit time t corresponding to that signal. Alteration of distance L in response to force-torque components can be achieved, for example, by affixing the signal-reflection means to the loadable means. This affixation can be accomplished by attaching the signal-reflection means directly to the loadable means or to an intermediate device or material attached to the loadable means. A portion of the surface of the loadable means (including an interface formed by it) can be used as the signal-reflection means and under such circumstances the signal-reflection means is deemed to be affixed to the loadable means.

Preferably, the sensor includes a substrate which can be any means for supporting the signal-transmission means and signal-detection means and thereby providing a reference position from which differences in signal transit time t (or differences in signal distance L) can be determined. The substrate provides direct support when the signal-transmission means or signal-detection means are mounted on or affixed to the substrate. The substrate provides indirect support when the signal-transmission means or signal-detection means are mounted on or affixed to an extension from the substrate.

The sensor further includes a means for determining a plurality of force-torque components. This determination can be accomplished by measuring the transit time t for a plurality of signals. These transit times can be used to calculate or measure force-torque components as demonstrated in Section V below. Force-torque components and changes in force-torque components can be monitored on a continuous basis to provide valuable information. For example, if the sensor is placed on a robotic end effector this information can be utilized for "touch sensitive" operation.

The sensor of this invention can also, of course, be used to detect and determine a single force-torque component as well as a plurality of such components. Not only can the sensor detect and determine $F_z$, where $F_z$ is normal to the contact surface of the loadable means, but the sensor can detect and determine any one of $F_x$, $F_y$, $M_x$, $M_y$ and $M_z$. The contact surface of the loadable means is the surface which comes into contact with the object or bodies to be gripped, encountered or "felt."

DESCRIPTION OF THE DRAWINGS

FIG. 5 depicts an "exploded" view of the sensor of FIG. 2.

FIG. 6 depicts a cross-sectional view of two leads and a transducer of the sensor of FIG. 2.

FIG. 7 depicts an overview of the multicomponent force-torque sensor described in Section VI with the cover plate removed.

FIG. 8 depicts a side view of the sensor of FIG. 7 with the cover plate.

FIRST EMBODIMENT OF THE INVENTION

Figure 1:
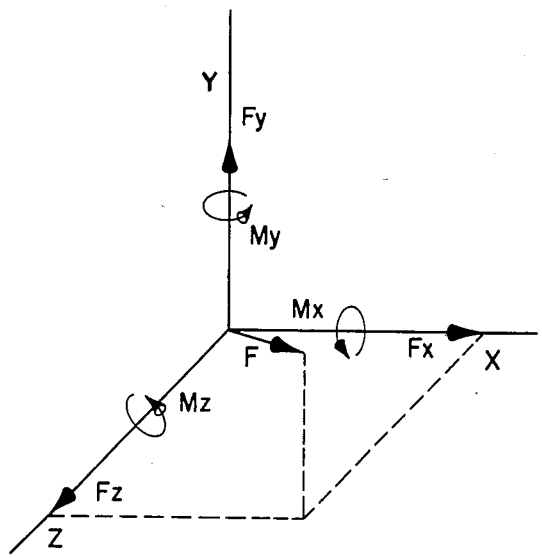
FIG. 1 depicts the force-torque components.
Figure 2:
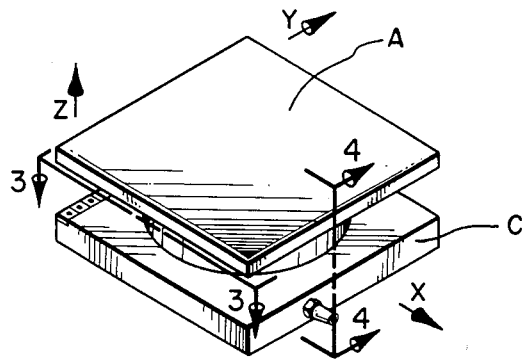
FIG. 2 depicts the multicomponent force-torque sensor described in Section V.
Figure 3:
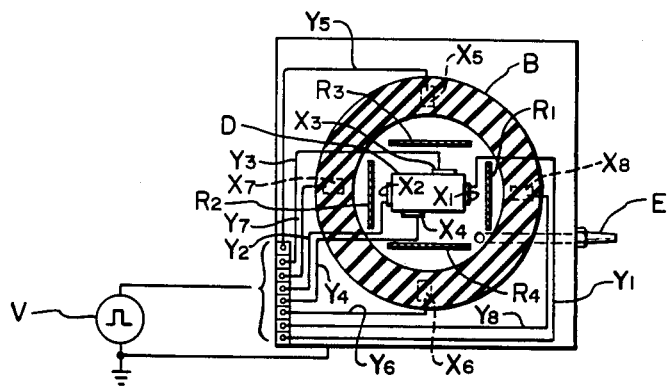
FIG. 3 depicts an overview of the sensor of FIG. 2 with the cover plate removed.
Figure 4:
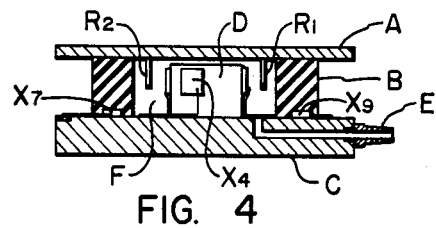
FIG. 4 depicts a side view of the sensor of FIG. 2.
Figure 9:
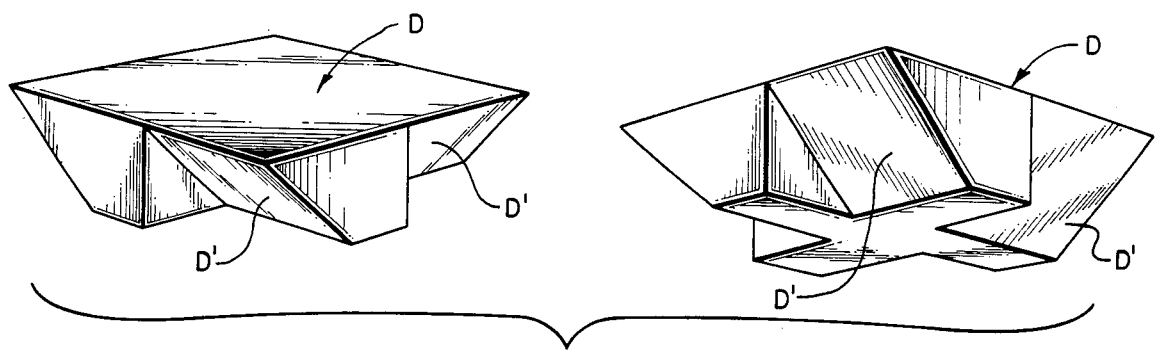
FIG. 9 depicts two perspectives of the reflecting post of the sensor of FIG. 7.

The multicomponent force-torque sensor depicted in FIGS. 2, 3, 4, 5 and 6 is one embodiment of this invention. The sensor includes a brass cover plate A bonded with a silicone rubber adhesive to a ring-shaped (cylindrical-shaped) elastomeric pad B. The elastomeric pad B is bonded with the same type of adhesive to a substrate C. The cover plate A is fabricated from a 1.6 mm thick brass plate and is in the form of a square (27 mm×27 mm). The elastomeric pad B is cast using degassed RTV-615 silicone rubber (supplied by General Electric) cured overnight at 60° C. The substrate is a 6.4 mm thick aluminum plate in the form of a square (27 mm×27 mm). The ring-shaped elastomeric pad B has an outside diameter of 25.4 mm, an inside diameter of 15.9 mm and a height of 6.4 mm. Brass reflectors $R_1$, $R_2$, $R_3$ and $R_4$ extend from the cover plate A. The dimensions of the rectangular reflectors are 5.8 mm (high)×6.2 mm (wide)×0.5 mm (thick).

The sensor further includes eight rectangular (2.0 mm×3.5 mm) transducers $X_1$, $X_2$, $X_3$, $X_4$, $X_5$, $X_6$, $X_7$ and $X_8$. Transducers $X_1$, $X_2$, $X_3$ and $X_4$ are mounted on vertical post D (4.8 mm×2.5 mm×5.0 mm). The vertical post D is made of brass. Transducers $X_5$, $X_6$, $X_7$ and $X_8$ are mounted on substrate C. Each of the transducers is made of 0.028 mm thick polyvinylidene fluoride (PVDF) (or other piezoelectric material) and metal electrodes on both sides of the PVDF. Leads $Y_1$, $Y_2$, $Y_3$, $Y_4$, $Y_5$, $Y_6$, $Y_7$ and $Y_8$ run from transducers $X_1$, $X_2$, $X_3$, $X_4$, $X_5$, $X_6$, $X_7$ and $X_8$ to a voltage source V. The voltage source V can be a conventional pulse generator. Each transducer has a thin film of tin-aluminum H vacuum deposited on the PVDF G (see FIG. 6) to serve as a first electrode. The vertical post D serves as the second electrode for Transducers $X_1$, $X_2$, $X_3$ and $X_4$. The substrate C serves as the second electrode for transducers $X_5$, $X_6$, $X_7$ and $X_8$. FIG. 6 depicts a cross-section of transducer $X_6$ and leads $Y_1$, $Y_6$ and $Y_8$. When subjected to excitation voltage pulses (typically ranging from about 5 v to about 50 v) from voltage source V and through leads $Y_1$, $Y_2$, $Y_3$, $Y_4$, $Y_5$, $Y_6$, $Y_7$ and $Y_8$, the PVDF between electrodes is mechanically distorted. This distortion results in the transmission of ultrasonic signals of approximately sinusoidal shape from the transducers. The cover plate A, elastomeric ring B and substrate C form a cavity F which holds a coupling agent. The coupling agent can be any fluid or deformable material through which the signals can travel. Silicone gel is the preferred coupling agent, however, other gels or liquids (e.g. silicone oil, water, etc.) can be used. The coupling agent is introduced into and removed from the cavity F through a filling port E. In an alternative embodiment the cavity F is filled with an elastomeric material which serves as the coupling agent.

The substrate C serves to support the transducers $X_1$, $X_2$, $X_3$, $X_4$, $X_5$, $X_6$, $X_7$ and $X_8$ and to provide a reference position from which differences in signal transit time (or differences in signal distance) can be determined. Substrate C directly supports transducers $X_5$, $X_6$, $X_7$ and $X_8$ which, as noted previously, are mounted on it. Substrate C indirectly supports transducers $X_1$, $X_2$, $X_3$ and $X_4$ which, as noted previously, are mounted on vertical post D which is an extension of (or fixed to) substrate C.

When an ultrasonic signal is transmitted from transducer $X_1$, $X_2$, $X_3$ or $X_4$ the signal travels through the coupling agent in cavity F, strikes the corresponding reflector $R_1$, $R_2$, $R_3$ or $R_4$ and returns to the transducer $X_1$, $X_2$, $X_3$ or $X_4$ from which the signal was transmitted. When an ultrasonic signal is emitted from transducer $X_5$, $X_6$, $X_7$ or $X_8$ the signal travels through the elastomeric pad B, strikes the cover plate A (which serves as a reflector) and returns to the transducer $X_5$, $X_6$, $X_7$ or $X_8$ from which it was transmitted. The application of force-torque components to the cover plate alters the distance $L'$ between transducers and corresponding reflectors (note that $L' = \frac{1}{2}L$) and, therefore, alters signal transit times. The substrate C, as noted previously, provides the reference position from which these changes in signal distance and signal transit time can be determined.

The reflection of an ultrasonic signal occurs at the interface of the signal-reflection means (i.e. reflector or cover plate) and the medium (i.e. coupling agent or elastomeric pad B) through which the signal travels. The signal-reflection means reflects the ultrasonic signal by forming this interface. When the ultrasonic signal returns to the transducer the signal distorts the PVDF. This distortion results in an electric signal. The electric signals from transducers $X_1$, $X_2$, $X_3$, $X_4$, $X_5$, $X_6$, $X_7$ and $X_8$ run through leads $Y_1$, $Y_2$, $Y_3$, $Y_4$, $Y_5$, $Y_6$, $Y_7$ and $Y_8$ to pulse-echo electronic circuitry. The time required for an ultrasonic signal to travel from the transducer to the reflector and from the reflector back to the transducer is the pulse-echo transit time. The pulse-echo electronic circuitry measures the pulse-echo transit time corresponding to each transducer. Conventional pulse-echo electronic circuitry is suitable for the practice of this invention. The means and technology needed for ultrasonic signal pulse generation, detection and transit time measurement are known to persons of skill in the art. Further information concerning ultrasonic transducers and related circuitry can be found, for example, in:

1. Myers, G. H., A. Thumin, S. Feldman, G. De Santis, and F. J. Lupo, A Miniature Pulser-Preamplifier for Ultrasonic Transducers, Ultrasonics, March 1972.
2. Mattila, P., and M. Luukkala, FET Pulse Generator for Ultrasonic Pulse Echo Applications, Ultrasonics, September 1981.
3. Duncan, M. G., An Automatic Noise-Blanking, Pulse-Timing Discriminator For Ultrasonic Nondestructive Testing, 1979 IEEE Ultrasonics Symposium.
4. Wells, P. N. T., Physical Principles of Ultrasonic Diagnosis, Academic Press, New York, 1969.
5. Swartz, R. G., and J. D. Plummer, On The Generation of High-Frequency Acoustic Energy with Polyvinylidene Fluoride, *IEEE Transactions on Sonics and Ultrasonics*, Vol. SU-27, No. 6, November 1980.
6. Shaw, H. J., D. Weinstein, L. T. Zitelli, C. W. Frank, R. C. DeMattei, and K. Fesler, $PVF_2$ Transducers, To Be Published.
7. DeReggi, A. S., S. C. Roth, J. M. Kenney, S. Edelman, and G. R. Harris, Piezoelectric Polymer Probe for Ultrasonic Applications, J. Acoust. Soc. Am. 69(3), March 1981.

The change in pulse-echo transit times ($\Delta t_1$, $\Delta t_2$, $\Delta t_3$, $\Delta t_4$, $\Delta t_5$, $\Delta t_6$, $\Delta t_7$ and $\Delta t_8$) produced by an applied force and/or torque are used to calculate the force-torque components as follows:

$$F_x = (\tfrac{1}{2}a)(\Delta t_1 - \Delta t_2)$$

$$F_y = (\tfrac{1}{2}b)(\Delta t_3 - \Delta t_4)$$

$$F_z = (-\tfrac{1}{2}c)(\Delta t_5 + \Delta t_6)$$

$$F_z = (-\tfrac{1}{2}c)(\Delta t_7 + \Delta t_8)$$

$$M_x = (\tfrac{1}{2}d)(\Delta t_5 - \Delta t_6)$$

$$M_y = (\tfrac{1}{2}e)(\Delta t_7 - \Delta t_8)$$

$$M_z = (\tfrac{1}{2}f)(\Delta t_3 + \Delta t_4)$$

Coefficients a, b, c, d, e and f are $2(k_i S_i)$ where $k_i$ is the elastomeric spring constant for the appropriate force or torque component (to be measured experimentally) and $s_i$ is the speed of the ultrasonic signal in the elastomeric pad B or the coupling agent, whichever is applicable. It is also noted that the distance $L'_i$ between a transducer and its reflector is equal to $(\tfrac{1}{2})(s_i t_i)$. For example, $L'_2 = (\tfrac{1}{2})(s_2 t_2)$ where $L'_2$ is the distance between $X_2$ and $R_2$, where $s_2$ is the speed of the signal in the coupling agent and $t_2$ is the pulse-echo transit time.

When the cover plate A is loaded, i.e. subjected to one or more forces ($F_x$, $F_y$, $F_z$) and/or torques ($M_x$, $M_y$, $M_z$) the transducer-reflector distance ($L'_i$) is altered and, therefore, the pulse-echo transit time ($t_i$) is altered. Using the above-described equations, the forces ($F_x$, $F_y$, $F_z$) and torques ($M_x$, $M_y$, $M_z$) can be monitored using periodically measured pulse-echo transit times.

Transducers $X_1$ and $X_2$ measure translation of the cover plate A along the x-axis (see FIG. 2) due to $F_x$ and rotation of the cover plate A due to $M_z$. Transducers $X_3$ and $X_4$ measure translation of the cover plate A along the y-axis (see FIG. 2) due to $F_y$ and rotation of the cover plate A due to $M_z$. The sign (positive or negative) of $M_z$ in the formula given above depends upon whether $t_3$ and $t_4$ increase or decrease. If reflectors $R_3$ and $R_4$ are rotated clockwise, reflector $R_3$ rotates closer to transducers $X_3$ (thus decreasing $t_3$) and reflector $R_4$ rotates closer to transducer $X_4$ (thus decreasing $t_4$). Therefore, when $t_3$ and $t_4$ decrease, it is known that $M_z$ is in a clockwise direction and when $t_3$ and $t_4$ increase, it is known that $M_z$ is in a counterclockwise direction.

In a variation of the embodiment depicted in FIGS. 2, 3, 4, 5 and 6 the post D can be three-sided (i.e. a cross-section viewed from above is triangular). The three-sided post has one transducer on each side. Three reflectors extending from the cover plate are positioned to reflect the signals from those transducers. Three other transducers are mounted in a triangular pattern on the substrate below the elastomeric pad. This arrangement can be utilized to determine all of the force-torque components. Although this arrangement requires only six transducers it is less favorable because the calculations necessary for determination of force-torque components are more complex.

PREFERRED EMBODIMENT OF THE INVENTION

The multicomponent force-torque sensor depicted in FIGS. 7, 8, 9, 10 and 11 is the preferred embodiment of the invention and is a modification of the embodiment depicted in FIGS. 2, 3, 4, 5 and 6. The dimensions of the various components of the preferred embodiment are the same as the dimensions of their counterparts in the first embodiment except as stated otherwise. The preferred sensor includes a brass cover plate A bonded with an adhesive to a ring-shaped (circular shaped) elastomeric pad B. The elastomeric pad B is bonded with adhesive to a ceramic substrate C. The cover plate A is fabricated from 1.6 mm thick brass. The elastomeric pad is made of RTV-615 silicone rubber as before.

Figure 10:
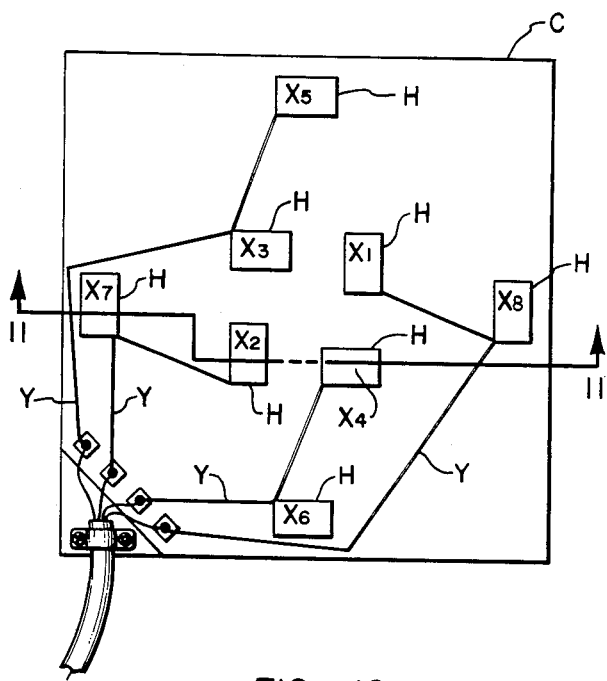
FIG. 10 depicts an overview of the substrate of the sensor of FIG. 7.
Figure 11:
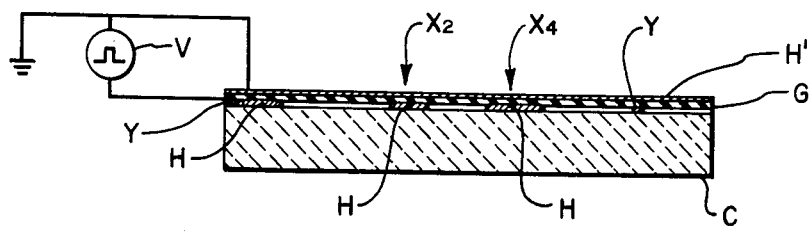
FIG. 11 depicts a cross-sectional view of the transducers and substrate of the sensor of FIG. 7.

The ceramic substrate C and ultrasonic transducers $X_1$, $X_2$, $X_3$, $X_4$, $X_5$, $X_6$, $X_7$ and $X_8$ are shown in better detail in FIGS. 10 and 11. All of the transducers are on one continuous sheet of PVDF and are mounted on the planar surface of the substrate C which greatly simplifies construction of the sensor and improves sensor accuracy because all transducers are mounted at the same time in a fixed geometric relationship. FIG. 10 shows the ceramic substrate C with a pattern of leads Y and electrodes H formed thereon. The pattern can be formed by vacuum depositing a thin film of gold (or other material capable of performing an electrode function) on the substrate and by subtracting undesired gold from the substrate through conventional photo-etching techniques. The substraction leaves the desired pattern of leads Y and electrodes H. Other conventional methods of deposition, substraction, addition, etc. can be utilized in the practice of this invention. FIG. 11 shows, in addition to ceramic substrate C and the lead and electrode pattern thereon, a thin sheet of PVDF G having a thin film of tin-aluminum H' vacuum deposited on it. Each transducer $X_1$, $X_2$, $X_3$, $X_4$, $X_5$, $X_6$, $X_7$ and $X_8$ is formed by the electrodes H and H' and the PVDF G material between the electrodes. The voltage pulse generator and pulse-echo circuitry described in Section V can be utilized in connection with this embodiment. Voltage excitation of the electrodes results in the transmission of ultrasonic signals.

The reflecting post D has four 45° metal reflecting surfaces D'. The reflecting post D, including its reflecting surfaces D', is made of brass (but can be made of any other metal or material capable of creating a good reflecting interface). Each reflecting surface D' is positioned above a transducer (i.e. $X_1$, $X_2$, $X_3$ or $X_4$) and forms a 45° angle with the plane defined by substrate C. When transducers $X_1$, $X_2$, $X_3$ and $X_4$ transmit ultrasonic signals, the signals are reflected 90° off of reflecting surfaces D' towards reflectors $R_1$, $R_2$, $R_3$ and $R_4$. Reflectors $R_1$, $R_2$, $R_3$ and $R_4$ reflect the signals back to the reflecting surfaces D' which in turn reflect the signals 90° back towards transducers $X_1$, $X_2$, $X_3$ and $X_4$. The ultrasonic signals from transducers $X_1$, $X_2$, $X_3$ and $X_4$ travel through a silicone gel coupling agent (or other coupling agent) which occupies cavity F. The coupling agent is introduced into and removed from the cavity F through a filling port E.

Transducers $X_5$, $X_6$, $X_7$ and $X_8$ operate as described in the description of the first embodiment in Section V. The electric signals from transducers $X_1$, $X_2$, $X_3$, $X_4$, $X_5$, $X_6$, $X_7$ and $X_8$ run through leads Y to electronic circuitry as shown in FIG. 10. The force-torque equations and related mathematics given in the description of the first embodiment are also applicable here, except that $M_z=(-\frac{1}{2}f)(\Delta t_3+\Delta t_4)=(-\frac{1}{2}f)(\Delta t_1+\Delta t_2)$. The sensor can detect and determine the force normal to the contact surface of cover plate A (i.e. the upper surface of cover plate A in FIG. 8). With reference to FIG. 8, $F_z$ is normal to the plane defined by cover plate A and therefore normal to the contact surface of the cover plate A (or loadable means). The sensor can also detect and determine any one or more of the other force-torque components (i.e. $F_x$, $F_y$, $M_x$, $M_y$ and $M_z$ in FIG. 8).

We claim:

1. A multicomponent force-torque sensor comprising:
   (a) a loadable means to which at least two force-torque components can be applied;
   (b) a plurality of signal-transmission means for transmitting signals;
   (c) a plurality of signal-reflection means for reflecting said transmitted signals;
   (d) a plurality of signal-detection means for detecting said reflected signals;
   (e) at least one medium through which said signals can travel;
   (f) a deformable means which is deformable in response to the application of force-torque components to said loadable means; and
   (g) a means for utilizing said detected signals to determine a plurality of force-torque components;

wherein (a), (b), (c), (d), (e) and (f) are adapted and arranged such that the application of a force-torque component to said loadable means results in the alteration of the distance traveled from signal-transmission means to signal-detection means by each of at least two of said signals.

2. A sensor in accordance with claim 1 wherein said loadable means is a surface of said deformable means.

3. A sensor in accordance with claim 1 wherein (g) is comprised of an electronic circuitry means for determining the transit time of each of said signals and for using said signal transit times to determine said plurality of force-torque components.

4. A sensor in accordance with claim 1 wherein said signal-reflection means are affixed to said loadable means.

5. A sensor in accordance with claim 1 wherein said signal-transmission means are ultrasonic transducers capable of transmitting an ultrasonic signal; and wherein said ultrasonic transducers also serve as said signal-detection means.

6. A sensor in accordance with claim 1 wherein said deformable means is an elastomeric material.

7. A sensor in accordance with claim 6 wherein said deformable means has a cylindrical shape.

8. A sensor in accordance with claim 1 further comprising (h) a substrate which supports said signal-transmission means and signal-detection means and which provides a reference position from which differences in signal transit time can be determined.

9. A sensor in accordance with claim 1 wherein said loadable means is a cover plate; and wherein said signal-transmission means are ultrasonic transducers; wherein said ultrasonic transducers also serve as said signal-detection means; wherein said signal-reflection means are affixed to said cover plate; wherein (g) is comprised of an electronic circuitry means for determining the transit time of each of said signals and for using said signal transit times to determine said plurality of force-torque components.

10. A sensor in accordance with claim 9 wherein said deformable means is an elastomeric material.

11. A multicomponent force-torque sensor comprising:
 (a) a cover plate;
 (b) a substrate;
 (c) a plurality of ultrasonic transducers capable of transmitting and detecting ultrasonic signals;
 (d) a pluraltiy of reflectors capable of reflecting said ultrasonic signals and positioned to reflect said ultrasonic signals back to said transducers;
 (e) a deformable means which is deformable in response to the application of force-torque components to said cover plate;
 (f) at least one medium through which ultrasonic signals transmitted from said ultrasonic transducer can travel; and
 (g) an electronic circuitry means for determining the transit time of said ultrasonic signals and for using said signal transit times to determine a plurality of force-torque components;

wherein (a), (b), (c), (d), (e) and (f) are adapted and arranged such that the application of a force-torque component to said cover plate results in the alteration of the transit time of at least one of said signals; and wherein said substrate provides support to said ultrasonic transducers and provides a reference position from which differences in signal transit time can be determined.

12. A sensor in accordance with claim 11 wherein said cover plate, said deformable means and said substrate form a cavity; and wherein said cavity contains a coupling agent which serves as a medium through which said ultrasonic signals can travel.

13. A sensor in accordance with claim 12 wherein said deformable means also serves as a medium through which said ultrasonic signals can travel.

14. A sensor in accordance with claim 13 further comprising:
 (h) a post to which at least one of said ultrasonic transducers is affixed.

15. A sensor in accordance with claim 13 further comprising:
 (h) a reflector post having at least one reflecting surface for reflecting at least one of said ultrasonic signals to its reflector and back to the ultrasonic transducer from which it was transmitted.

16. A sensor in accordance with claim 11 wherein said ultrasonic transducers are mounted on said substrate.

17. A sensor in accordance with claim 11 wherein said deformable means is in a cylindrical shape.

18. A process for determining a plurality of force-torque components comprising:
 (a) subjecting a loadable means to a plurality of force-torque components;
 (b) transmitting signals from a signal-transmission means;
 (c) reflecting said transmitted signals with a signal-reflection means;
 (d) detecting said reflected signals with a signal-detection means; and
 (e) determining the transit times of said signals to determine a plurality of force-torque components;
wherein the signal transit times are altered in response to the force-torque components to which said loadable means is subjected.

19. A process in accordance with claim 18 wherein said transit times and said force-torque components are determined utilizing an electronic circuitry means.

20. A process in accordance with claim 19 wherein said signal-transmission means and said signal-detection means are ultrasonic transducers.

21. A force-torque sensor comprising:
 (a) a loadable means having a contact surface to which at least one force-torque component selected from $F_x$, $F_y$, $M_x$, $M_y$ and $M_z$ can be applied;
 (b) a plurality of signal-transmission means for transmitting signals;
 (c) a plurality of signal-reflection means for reflecting said transmitted signals;
 (d) a plurality of signal-detection means for detecting said reflected signals;
 (e) at least one medium through which said signals can travel;
 (f) a deformable means which is deformable in response to the application of said force-torque component to said loadable means; and
 (g) a means for utilizing said detected signals to determine said force-torque component;
wherein (a), (b), (c), (d), (e) and (f) are adapted and arranged such that the application of said force-torque component to said loadable means results in the alteration of the distance traveled from signal-transmission means to signal-detection means by each of at least two of
 said signals; wherein said loadable means is oriented with respect to $F_x$, $F_y$, $M_x$, $M_y$, and $M_z$ in a frame of reference such that the Z-axis of said frame of reference is normal to said contact surface of said loadable means.

22. A sensor in accordance with claim 21 wherein (g) is comprised of an electronic circuitry means for determining the transit time of each of said signals and for using said signal transit times to determine said force-torque component.

23. A sensor in accordance with claim 21 wherein said signal-reflection means are affixed to said loadable means.

24. A sensor in accordance with claim 21 wherein said signal-transmission means are ultrasonic transducers capable of transmitting an ultrasonic signal; and wherein said ultrasonic transducers also serve as said signal-detection means.

25. A sensor in accordance with claim 21 further comprising (h) a substrate which provides support to signal-transmission means and signal-detection means and which provides a reference position from which differences in signal transit time can be determined.

26. A sensor in accordance with claim 25 wherein said loadable means is a cover plate; wherein said signal-transmission means are ultrasonic transducers; wherein said ultrasonic transducers also serve as said signal-detection means; wherein said signal-reflection means are affixed to said cover plate; and wherein (g) is comprised of an electronic circuitry means for determining the transit time of each of said signals and for using said signal transit times to determine said force-torque component.

27. A sensor in accordance with claim 26 wherein said deformable means is an elastomeric material in a cylindrical shape.

28. A sensor in accordance with claim 21 wherein said force-torque component is selected from $M_x$, $M_y$ and $M_z$.

* * * * *